United States Patent
Lin et al.

(10) Patent No.: US 11,754,472 B2
(45) Date of Patent: Sep. 12, 2023

(54) PROCESS DIAGNOSIS SYSTEM AND OPERATION METHOD THEREOF

(71) Applicant: Industrial Technology Research Institute, Hsinchu (TW)

(72) Inventors: Yi-Jin Lin, Taichung (TW); Shuo-Peng Liang, Taichung (TW); Chien-Chih Liao, Taichung (TW); Tzuo-Liang Luo, Taichung (TW); Wan-Kun Chang, Taichung (TW); Jen-Ji Wang, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/562,852

(22) Filed: Dec. 27, 2021

(65) Prior Publication Data
US 2023/0168155 A1    Jun. 1, 2023

(30) Foreign Application Priority Data
Nov. 30, 2021   (TW) ................... 110144592

(51) Int. Cl.
*G06F 11/30* (2006.01)
*G01M 99/00* (2011.01)

(52) U.S. Cl.
CPC ................. *G01M 99/005* (2013.01)

(58) Field of Classification Search
CPC .................................... G01M 99/005
See application file for complete search history.

(56) References Cited

U.S. PATENT DOCUMENTS

| 6,662,210 B1 | 12/2003 | Carleton et al. |
| 10,977,868 B2 | 4/2021 | Neeter |
| 11,079,748 B1 | 8/2021 | Garvey et al. |
| 2002/0160117 A1 | 10/2002 | Janicki et al. |

(Continued)

FOREIGN PATENT DOCUMENTS

| CN | 108919765 A | 11/2018 |
| CN | 111413887 A | 7/2020 |

(Continued)

OTHER PUBLICATIONS

Taiwan Patent Office, Office Action, Patent Application Serial No. 110144592, dated Oct. 5, 2022, Taiwan.

*Primary Examiner* — Phuong Huynh (57) ABSTRACT

A process diagnosis system includes a digital twin calculation unit, a process diagnosis calculation unit, and a remote calculation analysis unit. The digital twin calculation unit obtains a vibration-related parameter and a cutting-related parameter of a processing device, and performs a simulation calculation for the vibration-related parameter, the cutting-related parameter and a three-dimensional model corresponding to the processing device to generate a three-dimensional calculation result. The process diagnosis calculation unit receives a three-dimensional calculation result and displays the three-dimensional calculation result. The remote calculation analysis unit receives the three-dimensional calculation result, and performs a simulation analysis for the three-dimensional calculation result to generate an analysis result.

7 Claims, 6 Drawing Sheets

(56) References Cited

U.S. PATENT DOCUMENTS

| | | |
|---|---|---|
| 2005/0216429 A1 | 9/2005 | Hertz et al. |
| 2011/0134204 A1 | 6/2011 | Rodriguez et al. |
| 2017/0308057 A1* | 10/2017 | Kreidler ............. G05B 19/4069 |
| 2017/0318084 A1 | 11/2017 | Giffin et al. |
| 2021/0064000 A1 | 3/2021 | Baudisch et al. |
| 2021/0157312 A1 | 5/2021 | Celia et al. |
| 2021/0227178 A1 | 7/2021 | Lyon et al. |

FOREIGN PATENT DOCUMENTS

| | | |
|---|---|---|
| CN | 111736530 A | 10/2020 |
| CN | 111930027 A | 11/2020 |
| CN | 112651288 A | 4/2021 |
| CN | 112783138 A | 5/2021 |
| CN | 112487668 B | 7/2021 |
| CN | 113190886 A | 7/2021 |
| CN | 113268044 A | 8/2021 |
| TW | M545948 | 7/2017 |
| TW | I627518 | 6/2018 |
| TW | I682333 | 1/2020 |
| WO | WO2012131148 | 10/2012 |

\* cited by examiner

PROCESS DIAGNOSIS SYSTEM AND OPERATION METHOD THEREOF

CROSS REFERENCE TO RELATED APPLICATIONS

This application claims priority of Taiwan Patent Application No. 110144592, filed on Nov. 30, 2021, the entirety of which is incorporated by reference herein.

TECHNICAL FIELD

The present disclosure relates to a diagnosis system and an operation method thereof, and in particular, it relates to a process diagnosis system and an operation method thereof for a processing device.

BACKGROUND

Currently, when a processing device is abnormal, the remote expert may only remotely observe the information displayed on the device dashboard of the processing device through the frame, so as to provide corresponding assistance to the operator. However, since the remote expert may not observe the current state of the processing device, or may not perform real-time simulation and analysis for the current operating data of the processing device, the remote expert may not instantly provide the corresponding assistance, causing inconvenience of use. Therefore, how to effectively share the processing state of the processing device and eliminate the abnormality of the processing device in an intuitive and remote collaborative manner to increase the convenience of use has become a focus for technical improvements by various manufacturers.

SUMMARY

The present disclosure provides a process diagnosis system, which includes a digital twin calculation unit, a process diagnosis calculation unit and a remote calculation analysis unit. The digital twin calculation unit is configured to obtain a vibration-related parameter and a cutting-related parameter of a processing device, and perform a simulation calculation for the vibration-related parameter, the cutting-related parameter and a three-dimensional model corresponding to the processing device to generate a three-dimensional calculation result. The process diagnosis calculation unit is configured to receive a three-dimensional calculation result and display the three-dimensional calculation result. The remote calculation analysis unit is configured to receive the three-dimensional calculation result, and perform a simulation analysis for the three-dimensional calculation result to generate an analysis result.

The present disclosure provides an operation method of a process diagnosis system, which includes the following steps. A digital twin calculation unit is using to obtain a vibration-related parameter and a cutting-related parameter of a processing device, and perform a simulation calculation for the vibration-related parameter, the cutting-related parameter and a three-dimensional model corresponding to the processing device to generate a three-dimensional calculation result. A process diagnosis calculation unit is used to receive a three-dimensional calculation result and display the three-dimensional calculation result. A remote calculation analysis unit us used to receive the three-dimensional calculation result, and perform a simulation analysis for the three-dimensional calculation result to generate an analysis result.

BRIEF DESCRIPTION OF DRAWINGS

The present disclosure can be more fully understood by reading the subsequent detailed description and examples with references made to the accompanying drawings, wherein.

DETAILED DESCRIPTION OF DISCLOSED EMBODIMENTS

Technical terms of the present disclosure are based on general definition in the technical field of the present disclosure. If the present disclosure describes or explains one or some terms, definition of the terms is based on the description or explanation of the present disclosure. Each of the disclosed embodiments has one or more technical features. In possible implementation, a person skilled in the art would selectively implement all or some technical features of any embodiment of the present disclosure or selectively combine all or some technical features of the embodiments of the present disclosure.

In each of the following embodiments, the same reference number represents the same or a similar element or component.

Figure 1:
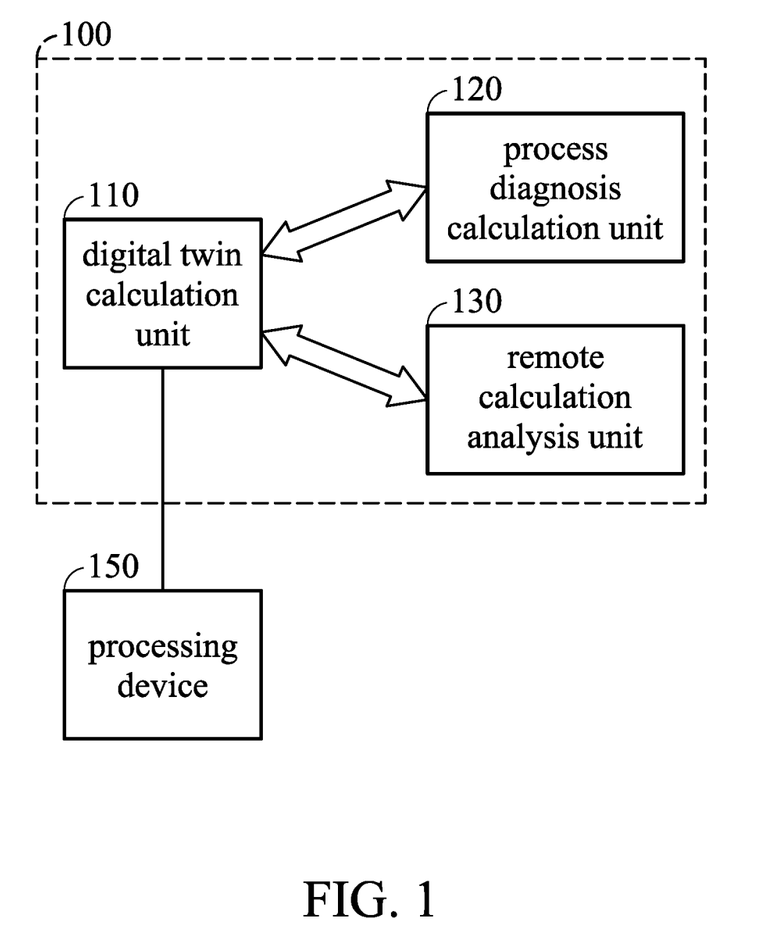
FIG. 1 is a schematic view of a process diagnosis system according to an embodiment of the present disclosure.

FIG. 1 is a schematic view of a process diagnosis system according to an embodiment of the present disclosure. In the embodiment, the process diagnosis system 100 may monitor and diagnose the processing state of a processing device 150. In addition, the above processing device 150 may be a five-axis processing machine, but the embodiment of the present disclosure is not limited thereto. Please refer to FIG. 1. The process diagnosis system 100 may include a digital twin calculation unit 110, a process diagnosis calculation unit 120 and a remote calculation analysis unit 130.

The digital twin calculation unit 110 may be configured on the processing device 150, and may monitor the processing device 150 to obtain a vibration-related parameter and a cutting-related parameter of the processing device 150. In the embodiment, the vibration-related parameter of the processing device 150 may include the device dynamic characteristic, the vibration frequency and the vibration amplitude of the processing device 150, but the embodiment of the present disclosure is not limited thereto. In addition, the cutting-related parameter of the processing device 150 may include a cutting force of a cutter, a vibration frequency of the cutter and a vibration amplitude of the cutter of the processing device 150, but the embodiment of the present disclosure is not limited thereto.

Then, the digital twin calculation unit 110 may perform a simulation calculation for the vibration-related parameter, the cutting-related parameter and a three-dimensional model corresponding to the processing device 150 to generate a three-dimensional calculation result. In the embodiment, the user may use a three-dimensional modeling tool to establish the three-dimensional model corresponding to the processing device 150 according to the type of the processing device 150 and store three-dimensional model in the digital twin calculation unit 110 in advance for subsequent operations.

For example, when the digital twin calculation unit 110 obtains the vibration-related parameter and the cutting-related parameter of a processing device 150, the digital twin calculation unit 110 may take out the three-dimensional model corresponding to the processing device 150, and perform the simulation calculation for the vibration-related parameter, the cutting-related parameter and the three-dimensional model to generate the three-dimensional calculation result corresponding to the processing device 150, wherein the above three-dimensional calculation result may represent the dynamic operation information of the processing device 150 in the real environment.

Figure 2:
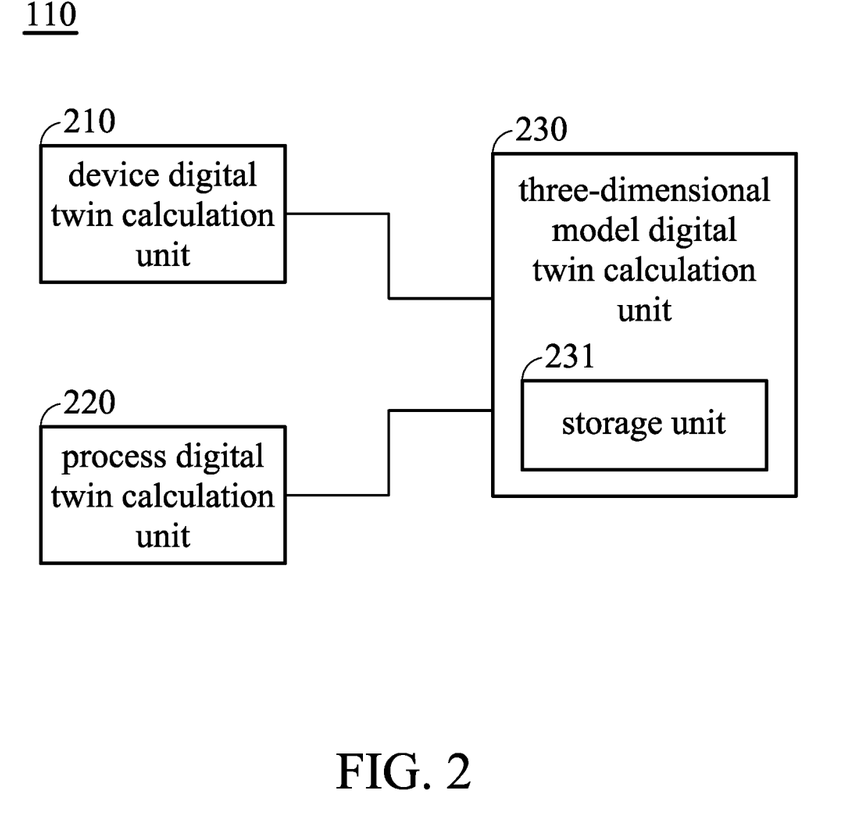
FIG. 2 is a schematic view of a digital twin calculation unit according to an embodiment of the present disclosure.

Furthermore, the digital twin calculation unit 110 may include a device digital twin calculation unit 210, a process digital twin calculation unit 220 and a three-dimensional model digital twin calculation unit 230, as shown in FIG. 2. The device digital twin calculation unit 210 may be configured on the processing device 150, and may monitor the processing device 150 to obtain the vibration-related parameter of the processing device 150. The process digital twin calculation unit 220 may be configured on a cutter of the processing device 150, and monitor the cutter of the processing device 150 to obtain the cutting-related parameter of the processing device.

The three-dimensional model digital twin calculation unit 230 is coupled to the device digital twin calculation unit 210 and the device digital twin calculation unit 220. The three-dimensional model digital twin calculation unit 230 receives the vibration-related parameter and the cutting-related parameter, and the three-dimensional model digital twin calculation unit 230 performs the simulation calculation for the vibration-related parameter, the cutting-related parameter and the three-dimensional model corresponding to the processing device 150 to generate the three-dimensional calculation result including the dynamic operation information that may represent the processing process of the processing device 150 in the real environment.

In addition, the three-dimensional model digital twin calculation unit 230 further includes a storage unit 231. The storage unit 231 may store the three-dimensional model corresponding to the processing device 150. That is, the user may use the three-dimensional modeling tool to establish the three-dimensional model corresponding to the processing device 150 according to the type of the processing device 150 and store three-dimensional model in the storage unit 110 in advance for subsequent operations of the three-dimensional model digital twin calculation unit 230.

The process diagnosis calculation unit 120 may communicate with the digital twin calculation unit 110, receive a three-dimensional calculation result and display the three-dimensional calculation result. In the embodiment, the process diagnosis calculation unit 120 receives, for example, the three-dimensional calculation result generated by the digital twin calculation unit 110 through a wired network or a wireless network. In some embodiments, the above wired network is, for example, an Ethernet, an optical fiber network, an asymmetric digital subscriber line (ADSL), etc., but the embodiment of the present disclosure is not limited thereto. In addition, the above wireless network is, for example, a wireless fidelity (WIFI), other telecommunication networks, etc., but the embodiment of the present disclosure is not limited thereto.

Figure 3:
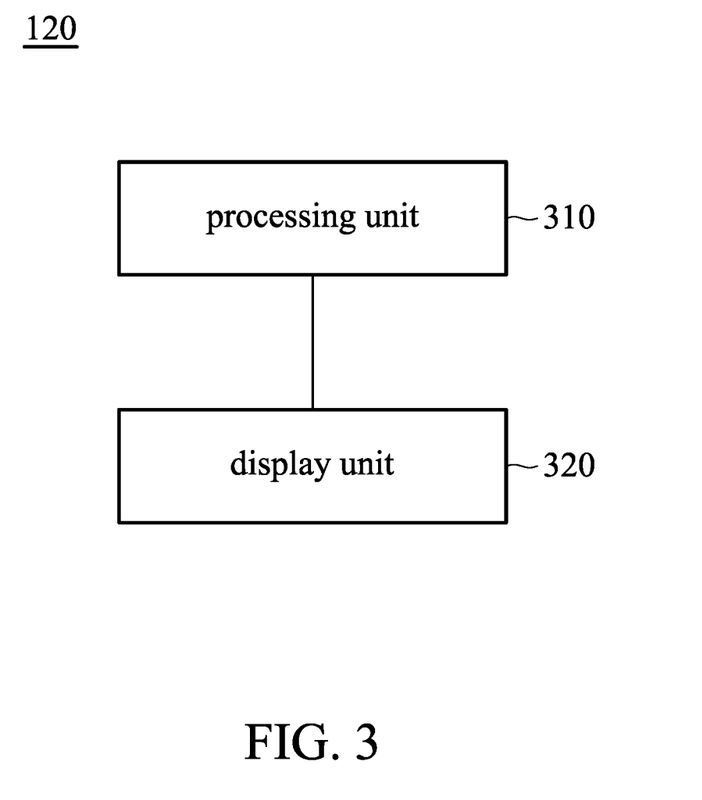
FIG. 3 is a schematic view of a process diagnosis calculation unit according to an embodiment of the present disclosure.

Furthermore, the process diagnosis calculation unit 120 may include a processing unit 310 and a display unit 320, as shown in FIG. 3. The processing unit 310 may communicate with the digital twin calculation unit 110, receive the three-dimensional calculation result, and output the three-dimensional calculation result. The display unit 320 is coupled to the processing unit 310, and receives and displays the three-dimensional calculation result. In the embodiment, the processing unit 310 may be a central processing unit (CPU), and the display unit 320 may be a display, but the embodiment of the present disclosure is not limited thereto.

In the embodiment, the process diagnosis calculation unit 120 may be configured on a personal computer, a mobile device or a wearable device, but the embodiment of the present disclosure is not limited thereto. Therefore, the operator may instantly know the processing state of the processing device 150 through the three-dimensional calculation result (including a combination of the vibration-related parameter, the cutting-related parameter and the three-dimensional model of the processing device 150) presented by the process diagnosis calculation unit 120, so as to confirm whether the processing state of the processing device 150 is abnormal. In addition, when confirming that the processing process of the processing device 150 is abnormal, the operator may eliminate the abnormal phenomenon in an intuitive manner, so as to increase the convenience of use.

The remote calculation analysis unit 130 may communicate with the digital twin calculation unit 110, receive the three-dimensional calculation result, and perform a simulation analysis for the three-dimensional calculation result to generate an analysis result. In the embodiment, the remote calculation analysis unit 130 receives, for example, the three-dimensional calculation result generated by the digital twin calculation unit 110 through the wired network or the wireless network. In some embodiment, the above wired network is, for example, the Ethernet, the optical fiber network, the asymmetric digital subscriber line (ADSL), etc., but the embodiment of the present disclosure is not limited thereto. In addition, the above wireless network is, for example, the wireless fidelity, other telecommunication networks, etc., but the embodiment of the present disclosure is not limited thereto.

Figure 4:
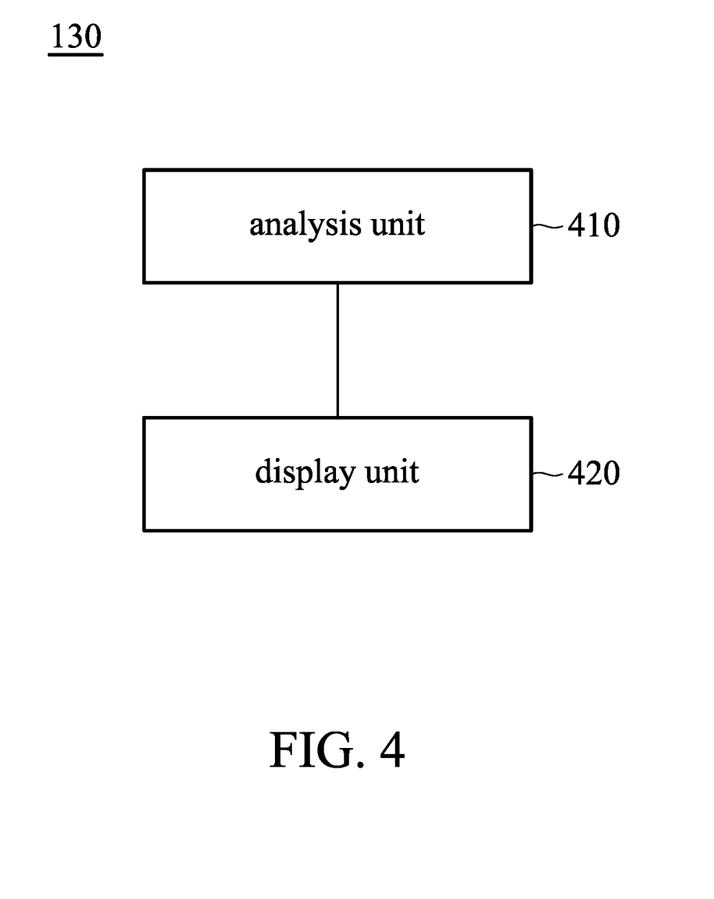
FIG. 4 is a schematic view of a remote calculation analysis unit according to an embodiment of the present disclosure.

Furthermore, the remote calculation analysis unit 130 may include an analysis unit 410 and a display unit 420, as shown in FIG. 4. The analysis unit 410 may communicate with the digital twin calculation unit 110, receive the three-dimensional calculation result, and perform the simulation analysis for the three-dimensional calculation result to generate the analysis result. That is, when the analysis unit 410 receives the three-dimensional calculation result generated by the digital twin calculation unit 110, the analysis unit 410 may perform the simulation analysis for the vibration-related parameter and the cutting-related parameter in the three-dimensional calculation result to generate the corresponding analysis result. The display unit 420 is coupled to the analysis unit 410, and receives and displays the analysis result. In the embodiment, the analysis unit 410 may be a micro controller unit (MCU) or a microprocessor, and the display unit 420 may be a display, but the embodiment of the present disclosure is not limited thereto.

In the embodiment, the remote calculation analysis unit 130 may be configured on a computer, but the embodiment of the present disclosure is not limited thereto. Therefore, the remote expert may instantly know the processing state of the processing device 150 through the analysis result presented by the remote calculation analysis unit 130 to confirm whether the processing state of the processing device 150 is abnormal. In addition, when the processing state of the processing device 150 is abnormal, the remote expert may instantly know the cause of the processing abnormality through the analysis result presented by the remote calculation analysis unit 130, and the remote expert and the operator may share the same information, so that the remote expert may assist the operator to understand the cause of processing abnormality of the processing device 150 in a remote collaborative manner, thereby increasing the convenience of use.

Figure 5:
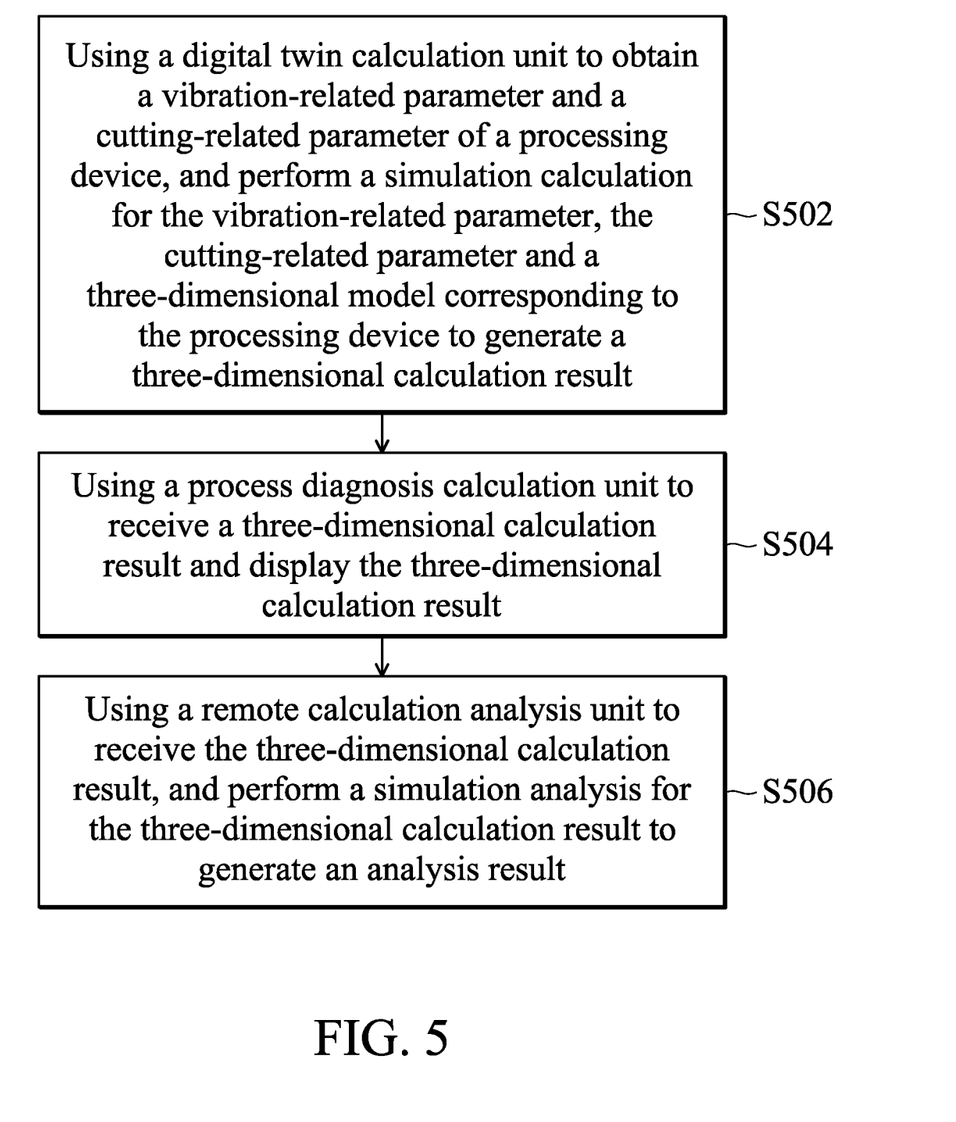
FIG. 5 is a flowchart of an operation method of a process diagnosis system according to an embodiment of the present disclosure.

FIG. 5 is a flowchart of an operation method of a process diagnosis system according to an embodiment of the present disclosure. In step S502, the method involves using a digital twin calculation unit to obtain a vibration-related parameter and a cutting-related parameter of a processing device, and perform a simulation calculation for the vibration-related parameter, the cutting-related parameter and a three-dimensional model corresponding to the processing device to generate a three-dimensional calculation result. In step S504, the method involves using a process diagnosis calculation unit to receive a three-dimensional calculation result and display the three-dimensional calculation result. In step S506, the method involves using a remote calculation analysis unit to receive the three-dimensional calculation result, and perform a simulation analysis for the three-dimensional calculation result to generate an analysis result.

In the embodiment, the above digital twin calculation unit include a storage unit, and the storage unit stores the three-dimensional model. The above vibration-related parameter includes, for example, the device dynamic characteristic, the vibration frequency and the vibration amplitude of the processing device. The above cutting-related parameter includes, for example, the cutting force of the cutter, the vibration frequency of the cutter and the vibration amplitude of the cutter of the processing device. The above process diagnosis calculation unit is configured on, for example, a personal computer, a mobile device or a wearable device. The above process diagnosis calculation unit receives, for example, the three-dimensional calculation result through a wired network or a wireless network. The above remote calculation analysis unit receives, for example, the three-dimensional calculation result through a wired network or a wireless network.

It should be noted that the order of the steps of FIG. 5 is only for illustrative purpose, but not intended to limit the order of the steps of the present disclosure. The user may change the order of the steps above according the requirement thereof. The flowcharts described above may add additional steps or use fewer steps without departing from the spirit and scope of the present disclosure.

Figure 6:
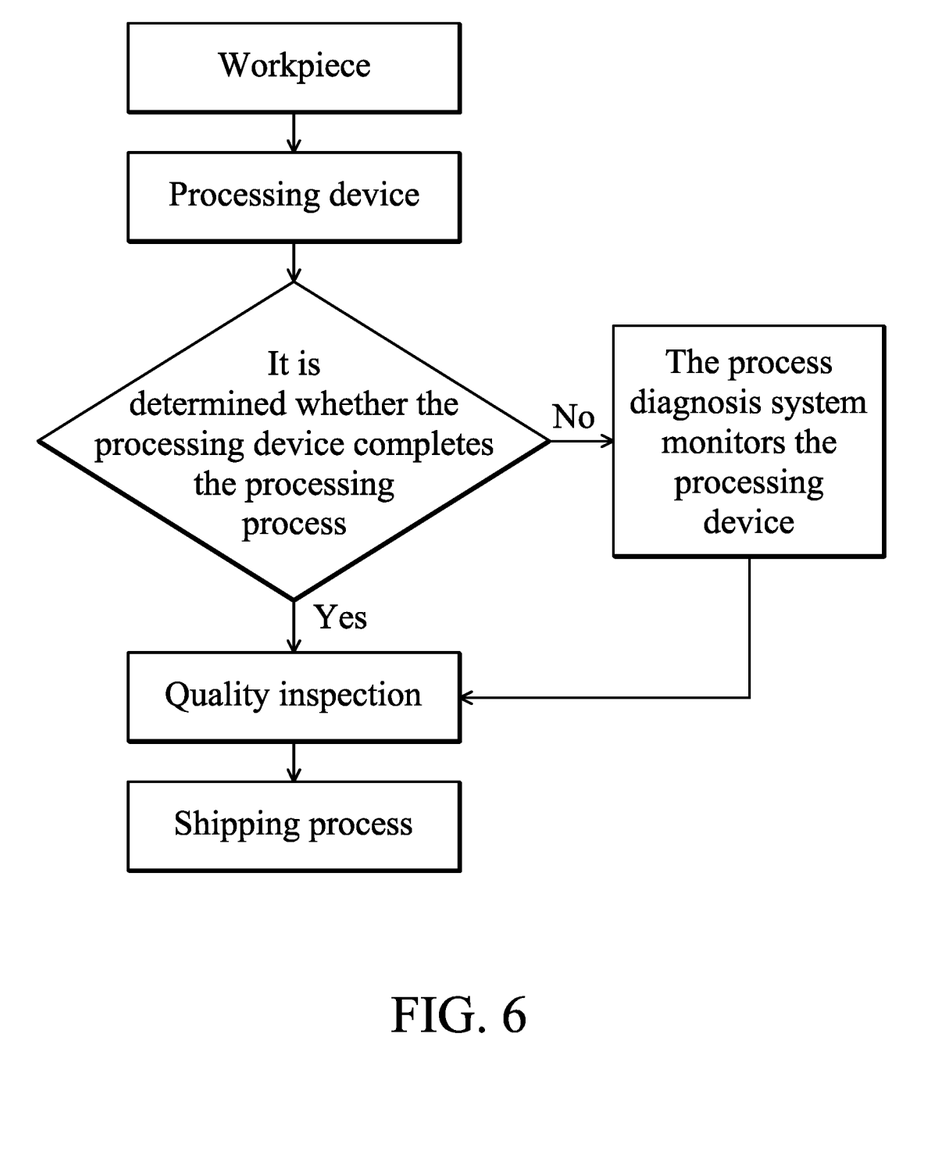
FIG. 6 is a schematic view of a processing process of a processing device according to an embodiment of the present disclosure.

FIG. 6 is a schematic view of a processing process of a processing device according to an embodiment of the present disclosure. Firstly, a workpiece is placed on the processing device 150. Then, the processing device 150 performs a processing process on the workpiece. Afterward, it is determined whether the processing device 150 completes the processing process. When determining that the processing device 150 completes the processing process, a quality inspection may be performed on the workpiece to confirm whether the quality of the workpiece meets the requirements. Finally, when the quality inspection of the workpiece is completed, the shipping process of the workpiece may be performed.

On the other hand, when determining that the processing device 150 does not complete the processing process, the processing device 150 may be monitored through the process diagnosis system 100 of the embodiment of the present disclosure to confirm whether the processing state of the processing device 150 is abnormal. When confirming that the processing state of the processing device 150 is not abnormal, it indicates that the processing device 150 may continue to perform the processing process on the workpiece, and the quality inspection process may be performed on the workpiece after the processing device 150 completes the processing process.

In addition, when confirming that the processing state of the processing device 150 is abnormal, the operator may instantly know the abnormality of the processing device 150 through the three-dimensional calculation result presented by the process diagnosis calculation unit 120, and eliminate the abnormality in an intuitive manner. Furthermore, the remote expert may also instantly know the cause of processing abnormality through the analysis result presented by the remote calculation analysis unit 130, and assist the operator to understand the cause of processing abnormality of the processing device 150 in a remote collaborative manner, so that the operator may eliminate the abnormal phenomenon in the intuitive manner, thereby increasing the convenience of use.

In summary, according to the process diagnosis system and the operation method thereof disclosed by the embodiments of the present disclosure, the digital twin calculation unit obtains the vibration-related parameter and the cutting-related parameter of the processing device, and perform the simulation calculation for the vibration-related parameter, the cutting-related parameter and the three-dimensional model corresponding to the processing device to generate the three-dimensional calculation result. The process diagnosis calculation unit receives the three-dimensional calculation result and displays the three-dimensional calculation result. The remote calculation analysis unit receives the three-dimensional calculation result, and performs the simulation analysis for the three-dimensional calculation result to generate the analysis result. Therefore, the processing state of the processing device may be effectively shared and the abnormality of of the processing device is eliminated in an intuitive and remote collaborative manner, so as to increase the convenience of use.

While the present disclosure has been described by way of example and in terms of the embodiments, it should be understood that the present disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A process diagnosis system, comprising:
 a digital twin calculation unit, configured on a processing device, wherein the digital twin calculation unit is configured to obtain a vibration-related parameter and a cutting-related parameter of the processing device, and perform a simulation calculation for the vibration-related parameter, the cutting-related parameter and a three-dimensional model corresponding to the processing device to generate a three-dimensional calculation result;

a process diagnosis calculation unit, configured on a personal computer, a mobile device or a wearable device, wherein the process diagnosis calculation unit is configured to receive a three-dimensional calculation result and display the three-dimensional calculation result; and a remote calculation analysis unit, configured on a computer, wherein the remote calculation analysis unit is configured to receive the three-dimensional calculation result, and perform a simulation analysis for the three-dimensional calculation result to generate an analysis result;

wherein the digital twin calculation unit comprises:
  a device digital twin calculation unit, configured to obtain the vibration-related parameter of the processing device;
  a process digital twin calculation unit, configured to obtain the cutting-related parameter of the processing device; and
  a three-dimensional model digital twin calculation unit, configured to receive the vibration-related parameter, the cutting-related parameter and the three-dimensional model corresponding to the processing device, and perform the simulation calculation for the vibration-related parameter, the cutting-related parameter and the three-dimensional model to generate the three-dimensional calculation result;

wherein the process diagnosis calculation unit comprises:
  a processing unit, configured to receive and output the three-dimensional calculation result; and
  a first display unit, configured to receive and display the three-dimensional calculation result;

wherein the remote calculation analysis unit comprises:
  an analysis unit, configured to receive the three-dimensional calculation result, and perform the simulation analysis for the three-dimensional calculation result to generate the analysis result; and
  a second display unit, configured to receive and display the analysis result.

2. The process diagnosis system as claimed in claim 1, wherein the three-dimensional model digital twin calculation unit comprises a storage unit, and the storage unit stores the three-dimensional model.

3. The process diagnosis system as claimed in claim 1, wherein the vibration-related parameter comprises a device dynamic characteristic, a vibration frequency and a vibration amplitude of the processing device.

4. The process diagnosis system as claimed in claim 1, wherein the cutting-related parameter comprises a cutting force of a cutter, a vibration frequency of the cutter and a vibration amplitude of the cutter of the processing device.

5. The process diagnosis system as claimed in claim 1, wherein the process diagnosis calculation unit receives the three-dimensional calculation result through a wired network or a wireless network.

6. The process diagnosis system as claimed in claim 1, wherein the remote calculation analysis unit receives the three-dimensional calculation result through a wired network or a wireless network.

7. An operation method of a process diagnosis system as claimed in claim 1, comprising:
  using a digital twin calculation unit to obtain a vibration-related parameter and a cutting-related parameter of a processing device, and perform a simulation calculation for the vibration-related parameter, the cutting-related parameter and a three-dimensional model corresponding to the processing device to generate a three-dimensional calculation result, wherein the digital twin calculation unit is configured on a processing device;

using a process diagnosis calculation unit to receive a three-dimensional calculation result and display the three-dimensional calculation result, wherein the process diagnosis calculation unit is configured on a personal computer, a mobile device or a wearable device; and using a remote calculation analysis unit to receive the three-dimensional calculation result, and perform a simulation analysis for the three-dimensional calculation result to generate an analysis result, wherein the remote calculation analysis unit, configured on a computer;

wherein the step of using the digital twin calculation unit to obtain the vibration-related parameter and the cutting-related parameter of the processing device, and perform the simulation calculation for the vibration-related parameter, the cutting-related parameter and the three-dimensional model corresponding to the processing device to generate the three-dimensional calculation result comprises:
  using a device digital twin calculation unit of the digital twin calculation unit to obtain the vibration-related parameter of the processing device;
  using a process digital twin calculation unit of the digital twin calculation unit to obtain the cutting-related parameter of the processing device; and
  using a three-dimensional model digital twin calculation unit of the digital twin calculation unit to receive the vibration-related parameter, the cutting-related parameter and the three-dimensional model corresponding to the processing device, and perform the simulation calculation for the vibration-related parameter, the cutting-related parameter and the three-dimensional model to generate the three-dimensional calculation result;

wherein the step of using the process diagnosis calculation unit to receive the three-dimensional calculation result and display the three-dimensional calculation result comprises:
  using a processing unit of the process diagnosis calculation unit to receive and output the three-dimensional calculation result; and
  using a first display unit the process diagnosis calculation unit to receive and display the three-dimensional calculation result;

wherein the step of using the remote calculation analysis unit to receive the three-dimensional calculation result, and perform the simulation analysis for the three-dimensional calculation result to generate the analysis result comprises:
  using an analysis unit of the remote calculation analysis unit to receive the three-dimensional calculation result, and perform the simulation analysis for the three-dimensional calculation result to generate the analysis result; and
  using a second display unit of the remote calculation analysis unit to receive and display the analysis result.

* * * * *